(12) United States Patent
Liu et al.

(10) Patent No.: US 7,239,682 B2
(45) Date of Patent: Jul. 3, 2007

(54) TIMING RECOVERY SYSTEM AND METHOD

(75) Inventors: Jingfeng Liu, Shrewsbury, MA (US); Hongwei Song, Pittsburgh, PA (US); Vijayakumar Bhagavatula, Upper St. Clair, PA (US)

(73) Assignee: Carnegie Mellon University, Pittsburgh, PA (US)

(*) Notice: Subject to any disclaimer, the term of this patent is extended or adjusted under 35 U.S.C. 154(b) by 772 days.

(21) Appl. No.: 10/292,641

(22) Filed: Nov. 12, 2002

(65) Prior Publication Data

US 2004/0091069 A1   May 13, 2004

(51) Int. Cl.
*H04L 7/00* (2006.01)

(52) U.S. Cl. .................................... 375/355

(58) Field of Classification Search ............ 375/226, 375/232, 235, 290, 293–294, 355, 359, 362, 375/341; 708/322–323
See application file for complete search history.

(56) References Cited

U.S. PATENT DOCUMENTS

| | | | |
|---|---|---|---|
| 5,717,778 A | 2/1998 | Chu et al. | |
| 5,832,046 A * | 11/1998 | Li et al. | 375/355 |
| 5,838,744 A | 11/1998 | Zheng | |
| 5,854,717 A * | 12/1998 | Minuhin | 360/65 |
| 5,905,767 A | 5/1999 | Fujimura | |
| 6,031,880 A * | 2/2000 | Li et al. | 375/326 |
| 6,104,762 A | 8/2000 | Fujimura | |
| 6,138,244 A | 10/2000 | Jin et al. | |
| 6,233,107 B1 * | 5/2001 | Minuhin | 360/51 |
| 6,263,032 B1 * | 7/2001 | Fredrickson et al. | 375/355 |
| 6,272,138 B1 | 8/2001 | Weon | |
| 6,278,730 B1 * | 8/2001 | Tsui et al. | 375/224 |
| 6,278,746 B1 | 8/2001 | Velez et al. | |
| 6,335,949 B1 | 1/2002 | Kim | |
| 6,381,291 B1 | 4/2002 | Yom | |
| 6,411,661 B1 | 6/2002 | Nguyen et al. | |
| 6,587,529 B1 * | 7/2003 | Staszewski et al. | 375/371 |
| 6,961,371 B2 * | 11/2005 | Wang et al. | 375/229 |
| 2004/0071232 A1 * | 4/2004 | de Souza et al. | 375/341 |

OTHER PUBLICATIONS

Liu et al., "Bound for loss of lock rate in partial response recording channels," *Electronic Letter*, vol. 38, No. 16, Aug. 2002.

* cited by examiner

*Primary Examiner*—Khanh Tran
(74) *Attorney, Agent, or Firm*—Kirkpatrick & Lockhart Preston Gates Ellis LLP

(57) ABSTRACT

Tracking methods and systems for providing timing recovery of continuous signals is presented. According to one embodiment, the method includes: sampling a continuous signal; estimating a timing disturbance of the sampled continuous signal; generating a timing adjustment signal in accordance with the estimated timing disturbance; and adjusting a sampling signal associated with a sampling device based on the timing adjustment signal.

61 Claims, 7 Drawing Sheets

TIMING RECOVERY SYSTEM AND METHOD

DESCRIPTION OF THE BACKGROUND

In, for example, hard disk drive (HDD) data storage systems, a continuous readback signal needs to be sampled prior to data detection. Data storage systems, however, introduce time-varying timing disturbances into the continuous readback signal. These delays are due to many factors, including disk speed variation, frequency offset between the different clocks used in the writing and reading processes, and clock wander. As data storage densities are pushed toward one terabit per square inch (1 Tb/in$^2$) and beyond, advanced signal detection algorithms such as iterative soft decoding are being suggested to cope with the lower signal-to-noise ratios (SNRs) and higher inter-symbol interference (ISI) inevitable at these densities.

In HDD systems, low SNR is a direct consequence of decreased track widths of the recording medium to accommodate increased track density. Unfortunately, at low SNRs, conventional phase-locked loop (PLL)-based decision-directed timing recovery schemes exhibit a large residual timing jitter. Residual timing jitter refers to the residual timing error introduced by the timing recovery system and is the difference between the estimated timing disturbance and the actual timing disturbance in a continuous readback signal as it is processed by the timing recovery system. Large residual timing jitter leads to frequent loss of lock, an event where the estimated timing disturbance differs considerably from the actual timing disturbance for a significantly long duration leading to misindexing of the detected bits and thus error bursts. Large residual timing jitter erodes SNR gains achieved by advanced signal detectors and ensures loss of lock. It is therefore desirable to develop timing recovery methods and systems that can perform well in low SNR environments. For conventional PLL-based decision-directed timing recovery schemes, the residual timing jitter can be decreased by employing reliable detection schemes within PLLs, such as a full Viterbi structure with a long decision window instead of a Viterbi detector having a short decision window. It is difficult, however, to maintain the stability of a PLL having a long delay. Another approach for reducing residual timing jitter is to use a soft timing error detector (TED), which uses soft information from a Soft Output Viterbi Algorithm (SOVA) with a forced short decision window. Test results show that the soft TED provides some improvement in terms of the residual timing jitter and the overall bit error rate (BER). Nevertheless, the soft TED method alone may not provide adequate performance at low SNRs, especially when a large PLL bandwidth is needed to track a relatively rapidly changing timing disturbance.

Accordingly, there exists a need for a new timing recovery system and method to perform timing recovery in low SNR partial response recording channels.

BRIEF SUMMARY OF THE INVENTION

In one general respect, the present invention is directed to a tracking method for providing timing recovery of continuous signals. According to one embodiment, the method includes sampling a continuous signal and estimating a timing disturbance of the sampled continuous signal. The method further includes generating a timing adjustment signal in accordance with the estimated timing disturbance, and adjusting a sampling signal associated with a sampling device based on the timing adjustment signal.

According to another embodiment, the method includes estimating a timing disturbance of a sampled continuous signal at a predetermined sampling instant. The sampled continuous signal comprises a plurality of sectors, wherein each sector comprises one or more segments of a predetermined number of bits (M). The method further includes estimating a timing offset signal at a corresponding channel bit of the sampled continuous signal, and generating a timing adjustment signal based on the timing offset signal.

In another general respect, the present invention is directed to a tracking system for providing timing recovery of continuous signals. According to one embodiment, the system includes a sampling device for sampling the continuous signal, and a filter in communication with the sampling device. The filter is for estimating a timing disturbance of the continuous signal and generating a timing adjustment signal in accordance with the estimated timing disturbance. The filter is further for adjusting a sampling signal associated with the sampling device to obtain a sampled version of the continuous signal based on with the timing adjustment signal.

According to another embodiment, the system includes a filter for receiving an estimated timing disturbance signal of a sampled version of the continuous signal at a predetermined sampling instant. The sampled version of the continuous signal comprises a plurality of sectors, each sector comprising one or more segments of a predetermined number (M) of bits. The filter is further for estimating a timing offset signal at a corresponding channel bit of a sampled continuous signal, and generating a timing adjustment signal based on the timing offset signal.

In another general respect, the present invention is directed to a filter for a timing recovery system. According to one embodiment, the filter includes means for receiving an estimated timing disturbance signal of a sampled version of the continuous signal at a predetermined sampling instant. The sampled version of the continuous signal comprises a plurality of sectors, each sector comprising one or more segments of a predetermined number (M) of bits. The filter further includes means for estimating a timing offset signal at a corresponding channel bit of a sampled continuous signal and means for generating a timing adjustment signal based on the timing offset signal.

DESCRIPTION OF THE DRAWINGS

Embodiments of the present invention are described herein in conjunction with the following figures, wherein.

DETAILED DESCRIPTION OF THE INVENTION

Figure 1:
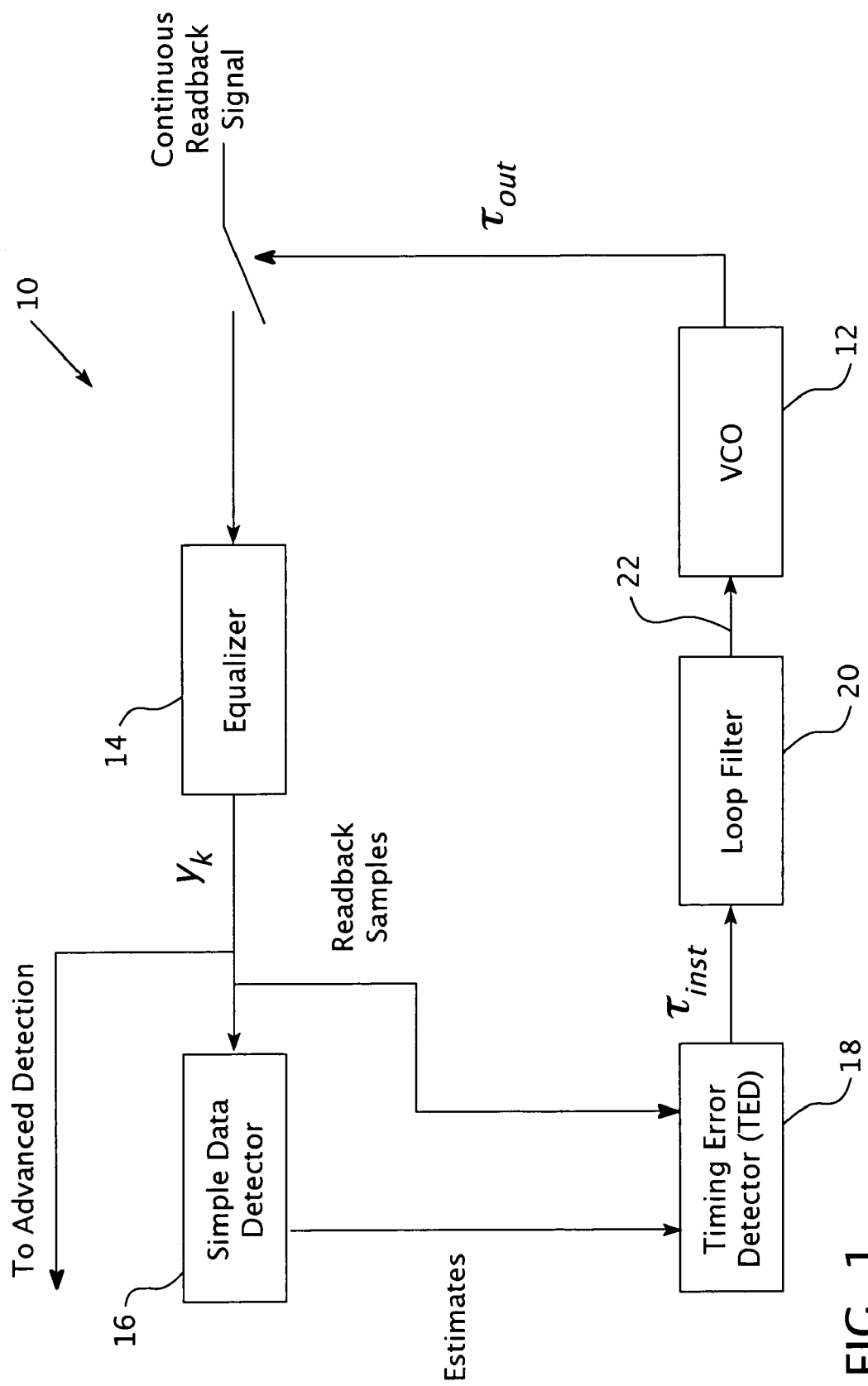
FIG. 1 is a block diagram of a conventional timing recovery scheme approach in magnetic recording systems.

For convenience, the following acronyms and abbreviations are used herein.

| | |
|---|---|
| AWGN | Additive White Gaussian Noise |
| BER | Bit Error Rate |
| BCJR | Bahl, Cocke, Jelenik, Raviv (algorithm) |
| DSK-STR | Dual Segmented Kalman Filters Based Timing Recovery |
| EPR4 | Extended Partial Response 4 ($1 + D - D^2 - D^3$) |
| FIR | Finite Impulse Response (filter) |
| FUG | Frequency Update Gain |
| ISI | Inter-symbol Interference |
| ITR | Interpolation Timing Recovery |
| LDPC | Low Density Parity Check |
| LLR | Log Likelihood Ratio |
| LMS | Least Mean Squares (algorithm) |
| M&M TED | Mueller and Muller Timing Error Detector |
| MMSE | Minimum Mean Squared Error |
| PLL | Phase Locked Loop |
| PR | Partial Response |
| PR4 | Partial Response 4 (target $1-D^2$) |
| PRML | Partial Response Maximum Likelihood |
| PUG | Phase Update Gain |
| RMS | Root Mean Square |
| SDD-TED | Soft Decision Directed Timing Error Detector |
| SNR | Signal-to-Noise Ratio |
| SOVA | Soft Output Viterbi Algorithm |
| TED | Timing Error Detector |
| VCO | Voltage Controlled Oscillator |

In one embodiment, the present invention is directed to tracking systems and methods used for performing timing recovery of continuous readback signals, and may be applicable in timing recovery schemes used in communication systems, data storage systems, and the like. For example, the tracking techniques of the present invention may be used for performing timing recovery in low-SNR partial response data storage channels. Throughout this description, the tracking/timing recovery scheme of the present invention is sometimes referred to generally as a "dual segmented Kalman filters based timing recovery (DSK-STR)." An underlying tracking/timing recovery scheme in accordance with embodiments of the present invention may include, for example, a phase-locked loop (PLL) based tracking/timing recovery scheme. The DSK-STR scheme of the present invention also may utilize two or more intertwined PLLs wherein update gains corresponding to each PLL may be updated according to modified Kalman filters at each symbol instant, for example, as described further herein.

In data storage systems that employ partial response (PR) data storage channels, an equalizer is generally utilized to control the amount of ISI while simultaneously minimizing the amplification of noise that may be present along with the continuous data signals. The PR data storage channels, such as the PR4 and the extended PR4 (EPR4) channels, are commonly used in conventional magnetic hard disk drives, whereas other PR data storage channels are used in optical recording systems. The present invention, however, should not be construed as being limited to conventional magnetic hard disk drives or optical recording systems, but may be applied to various other recording systems having perpendicular magnetic recording systems, for example, as well as digital communication systems including wireless, satellite, optical, and the like.

One embodiment of the tracking/timing recovery scheme of the present invention will now be described by way of an example with reference to a recording system model. As discussed hereinbefore, however, those skilled in the art will appreciate that the tracking/timing recovery scheme of the present invention is not limited thereto as it can be applied to communication systems as well.

Recording systems experience time-varying timing disturbances due to many factors including disk speed variations, frequency offset between different clocks used in the writing and reading processes, clock wander, and the like. Accordingly, a continuous-time readback signal y(t) of a recording system in may be modeled as follows:

$$y(t) = \sum_{k=-\infty}^{\infty} a_k h[t - kT - \tau(t)] + n(t) \quad (1)$$

where $a_k$ are channel bits that take on values of +1 and −1 in binary recording, h(t) is a time-varying channel pulse response, n(t) is additive noise (i.e., the total noise including the media noise and electronics noise), and T is a channel bit interval. A timing disturbance term τ(t) represents the timing variability of the timing recovery system. A timing recovery module may be utilized to estimate the timing disturbance τ(t) and to adjust the clock associated with the recording system for obtaining continuous readback signal samples that effectively correspond to zero timing disturbance (i.e., τ(t=0)).

FIG. 1 is a block diagram of a timing recovery module (loop) 10 for recording channels taking the form of a discrete second-order PLL. Such a timing recovery module 10 is generally used in magnetic recording systems. A sampling device such as a voltage controlled oscillator (VCO) 12 controls a clock and generates a synchronized clock signal $\tau_{out}$, which is used for sampling the continuous readback signal. The continuous readback signal samples are input into an equalizer 14 where the samples are equalized. The equalized readback samples $y_k$ are then input into a simple data detector 16 such as, for example, a slicer or a Viterbi detector having a short decision delay. The simple data detector 16 provides preliminary bit estimates corresponding to the equalized readback samples $y_k$ to a timing error detector (TED) 18. The TED 18 uses the equalized readback samples $y_k$ and the corresponding estimated bits from the simple data detector 16 to generate a phase adjustment signal $\tau_{inst}$ representing the timing adjustment to be applied at each bit instant. A low pass loop filter 20, in order to reduce any noise present on the timing adjustment signal $\tau_{inst}$, filters the timing adjustment output $\tau_{inst}$ of the TED 18. The low pass loop filter 20 output on line 22 drives the VCO 12, which generates the synchronized clock signal $\tau_{out}$. The recovered version of the actual timing disturbance τ(t) is $\tau_{inst}(t)$ The difference between $\tau_{inst}(t)$ and τ(t) is the residual timing jitter.

When the timing recovery module 10 is enabled, the initial phase offset and frequency offset of the continuous readback signal may be relatively large. The timing recovery module 10 must, therefore, reduce the large initial phase offset and frequency offset in a relatively short time. In storage systems, a preamble comprising a known pattern of bits may be included in the continuous readback signal to reduce such large offsets. Timing recovery in data storage systems is generally performed in two stages referred to as acquisition mode and tracking mode. During the first stage (i.e., the acquisition mode), large phase and frequency corrections may be made using a known preamble pattern, for example. During the second stage (i.e., the tracking mode), small and slow timing disturbance corrections may be made using bits extracted from the readback samples. The present invention relates generally to performing timing recovery in the tracking mode.

As illustrated in FIG. 1, a component of a timing recovery system is the TED 18. One example of a decision directed TED 18 that may be incorporated in one embodiment of the present invention is the Mueller and Müller (M&M) TED. The output of a M&M type TED is given generally as follows:

$$\tau_{inst}(k) = y_{k-1}d_k - d_{k-1}y_k \quad (2)$$

where $y_k$ are the equalized readback samples that reflect the noise and timing disturbances present in the continuous readback signal and $d_k$ are the ideal values that would have been obtained from a perfect equalization in the absence of any noise and timing disturbances. In PR channels, the $d_k$ ideal values may be the linear combinations of channel bits $a_k$. For example, $d_k = a_k - a_{k-2}$ for a PR4 target (i.e., $1-D^2$), and $d_k = a_k + a_{k-1} - a_{k-2} - a_{k-3}$ for an EPR4 target (i.e., $1-D_2$), and $d_k = a_k + a_{k-1} - a_{k-2} - a_{k-3}$ for an EPR4 target (i.e., $1+D<D_2-D^3$). Because $a_k$ assumes binary values ($-1$ and $-1$), $d_k$ may assume only a finite number of values, generally referred to as hard values. For example, $d_k \in [-2,0,2]$ for PR4, and $d_k \in [-4,-2,0,2,4]$ for EPR4. In conventional recording channels, the simple data detector 16 may be used to estimate the $a_k$ values and a linear combination of estimated $a_k$ values may be used to estimate the desired $d_k$ ideal values. At low SNRs, however, the simple data detector 16 generally makes many decision errors resulting in an extremely noisy $\tau_{inst}$ signal and, consequentially, in an unacceptably large residual timing jitter.

Other data detection schemes such as LDPC codes or Turbo codes may be employed in various other embodiments of the present invention in order to achieve more accurate channel bit estimates at low SNRs without departing from the general scope of the present invention. Such advanced detection approaches, however, may introduce significant decision delays in the timing recovery loop 10 and thus may reduce the stability margin of the loop 10. Nevertheless, such advanced detection methods may be used for detecting data outside the timing recovery loop 10 in order to achieve acceptably low bit error rates.

Another TED 18 approach that may be utilized is a soft decision directed TED (SDD-TED). An SDD-TED uses soft information $\bar{d}_k$ ideal values in place of the $d_k$ ideal values used in the hard output M&M type TED. A soft output Viterbi algorithm (SOVA) detector can provide soft information in the form of a log-likelihood ratio (LLR) having a relatively short decision delay. Soft output SOVA detectors are generally used in iterative soft decoding applications. The LLR may be defined as:

$$LLR(a_k) = \log\left(\frac{Pr(a_k = 1)}{Pr(a_k = -1)}\right) \quad (3)$$

The SOVA detector may be used with a forced short delay by outputting the soft information after a short delay, as illustrated in the simple data detector 16 of FIG. 1, for example. This leads to a formulation for an SDD-TED as follows:

$$\tau_{inst}(k) = y_{k-1}\bar{d}_k - \bar{d}_{k-1}y_k \quad (4)$$

where the $\bar{d}_k$ soft decisions values are referred as the expected values of the desired bits that may be obtained by a linear combination of expected values of the channel bits $\bar{a}_k$. For example, $\bar{d}_k = \bar{a}_k - \bar{a}_{k-2}$ for a PR4 target and $\bar{d}_k = \bar{a}_k - \bar{a}_{k-1} - \bar{a}_{k-2} - \bar{a}_{k-3}$ for an EPR4 target where $\bar{a}_k$ may be estimated from the LLR of $\bar{a}_k$. The output from a SOVA detector may be expressed as follows:

$$\bar{a}_k = \frac{\exp[LLR(a_h)] - 1}{\exp[LLR(a_h)] + 1} \quad (5)$$

Figure 2:
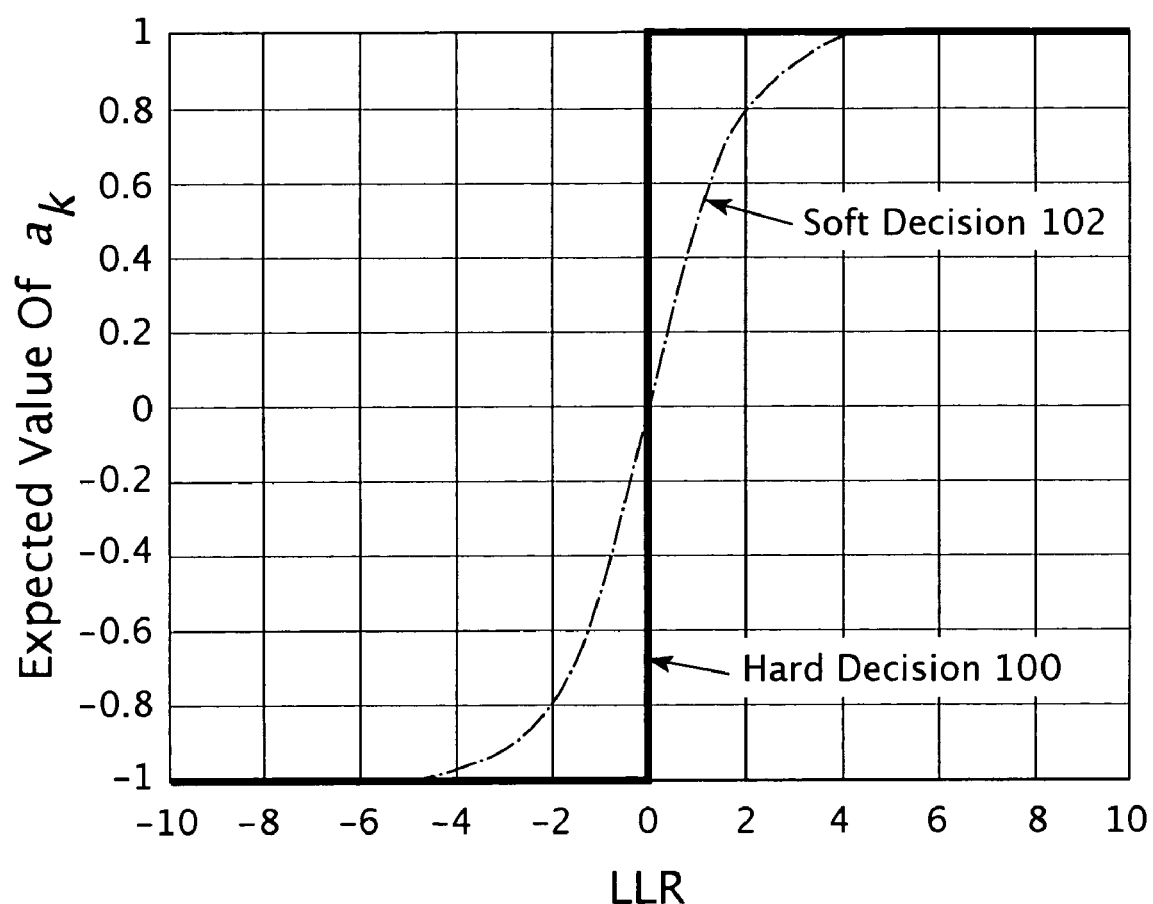
FIG. 2 is a graph illustrating hard and soft decisions of channel bits $a_k$ as a function of a log likelihood ratio (LLR)

FIG. 2 is a graph showing the hard decision 100 and the soft decision 102 versions of the channel bits $\bar{a}_k$ as a function of the LLR. It is seen that by using the soft decision 102 information, the SDD-TED gives more weight to the more reliable bit estimates ($|LLR(a_k)| >> 0$) rather than to the less reliable estimates ($|LLR(a_k)| \cong 0$).

Generally, the timing disturbance $\tau(t)$ in recording systems may be characterized as linear, sinusoidal timing disturbance or autoregressive (AR). The linear timing disturbance model corresponds to a constant frequency offset between an actual bit rate and a sampled bit rate. It is the model generally used for the kinds of timing disturbances observed in magnetic type hard disk drives. The sinusoidal timing disturbance model generally is used when a servo loop cannot damp out excessive vibration in the head/media interface. Tracking a sinusoidal timing disturbance requires a PLL with a relatively large bandwidth. A PLL with large bandwidth, however, permits large amounts of noise to pass through the PLL making it challenging to perform timing recovery when a sinusoidal type of timing disturbance is present in the continuous readback signal. The autoregressive timing disturbance model corresponds to the random nature of timing disturbance especially during the tracking mode when the frequency offset is relatively small and there is no initial phase offset.

In a conventional PLL-based timing recovery scheme, the bandwidth ($B_n$) of the PLL is designed to enable the PLL to track the timing disturbance while simultaneously suppressing noise to a sufficiently low level. Conventional timing recovery schemes are equivalent to a timing offset estimation-based feedforward timing recovery scheme where a sector is divided into small segments of N bits (typically $N=1/2B_n$) and the timing offsets are assumed to be constant over the N bits. Such a timing recovery scheme effectively uses a piecewise constant approximation of the timing disturbance if the timing disturbance is changing slowly, N may be relatively large without significantly violating the piecewise constant approximation. Conversely, if the timing disturbance changes relatively rapidly, N may be relatively small in order to use piecewise constancy while the number of segments per fixed length sector may be relatively large. Thus, in a conventional timing recovery scheme the number of parameters to be estimated, such as the number of timing offsets of the segments, becomes large and the performance of the timing disturbance estimation degrades, especially at low SNRs.

One embodiment of the present invention provides an estimate of the timing disturbance using a piecewise linear approximation. In such an embodiment a sector is divided into longer segments of M bits and it is assumed that the slopes of the timing disturbance i.e., the frequency offsets, in each segment are constant. Furthermore, the initial phase offset present in a given segment is assumed to be the same as the final phase offset of a previous segment. Estimating the timing disturbance becomes the equivalent of estimating the initial phase offset of a first segment and the frequency offsets of all segments. Estimating the timing disturbance by piecewise linear approximation significantly reduces the number of parameters to be estimated because each segment is divided into a much longer number of bits than was previously required in conventional timing recovery schemes. Therefore, the performance of the timing recovery process based on the piecewise linear approximation model in accordance with one embodiment of the present invention provides an improvement over conventional timing recovery processes and methods.

Dual Segmented Kalman Filters Based Timing Recovery (DSK-STR)

Figure 5:
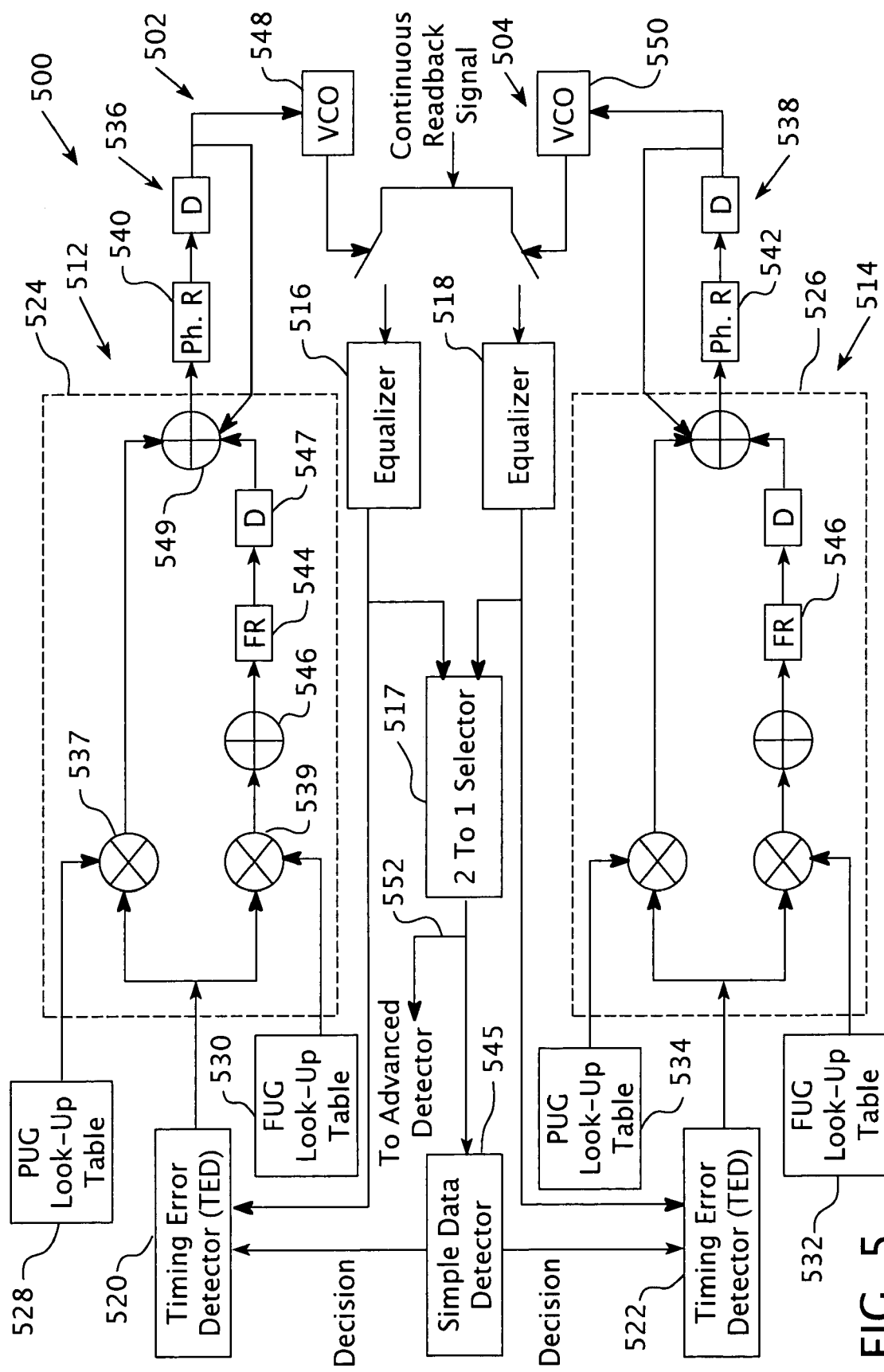
FIG. 5 illustrates a DSK-STR architecture in accordance with one embodiment of the present invention.

FIG. 5 is a diagram of a Dual Segmented Kalman Filters Based Timing Recovery (DSK-STR) system 500 according to one embodiment of the present invention. As illustrated in FIG. 5, the system 500 may include two branches 502, 504, although according to other embodiment, a greater number of similar branches may be utilized. Each branch may include a Kalman filter, as illustrated in FIG. 5, wherein the branch 502 includes Kalman filter 512 and the branch 504 includes the Kalman filter 514. Those skilled in the art will appreciate that the Kalman filters 512, 514 may be implemented in the form of one or more digital signal processors.

Details of the operation of the system 500 are provided hereinafter, but first a preliminary identification of the components of the system 500 is provided to facilitate understanding of the discussion to follow. A continuous readback signal is sampled by two sampling devices 548, 550, one for each branch 502, 504. The sampling devices 548, 550 may be, as illustrated in FIG. 5, voltage-controlled oscillators (VCOs). The output of the sampling devices 548, 550 is provided to equalizers 516, 518 respectively. The outputs of the equalizers 516, 518 are provided to TEDs 520, 522 respectively. In addition, the outputs of the equalizers 516, 518 may be provided to a multiplexer 517, the output from which may be provided to a simple data detector 546, which as explained further hereinafter, supplies decisions to the respective TEDs 520, 522.

The Kalman filter 512 of the branch 502 is used to control the sampling device 548 for the branch 502, and similarly the Kalman filter 514 of the branch 504 is used to control the sampling device 550 of that branch. For simplicity, an overview of the components only one Kalman filter 512 is now provided, recognizing that the other Kalman filter 514 may be similarly configured.

The Kalman filter 512 may comprise a loop filter 524. Input from the TED 520 is supplied to two braches of the loop filter 524: one branch is updated at mixing node 537 with a phase update gain (PUG), to be described further hereinafter, which may be stored in a memory look-up table 528, and the other branch is updated at mixing node 539 with the frequency update gain (FUG), also to be described further hereinafter, which may be similarly stored in a memory look-up table 530. The loop filter 524 may further include a first summer 545, a frequency register 544, a digital unit delay 547, and a second summer 549. The frequency update signal is supplied to the summer 545, where it is summed with the output of the digital unit delay 547. The frequency register 544 is connected between the summer 545 and the digital unit delay 547. Output from the digital detector 547 is also supplied to the summer 549, where it is summed with the phase update signal.

The output from the summer 549 is supplied to phase register 540, and the output of the phase register 540 is supplied to a digital unit delay 536. The output of the digital detector 536 controls the sampling device 548, and is also fed back to the summer 549.

The DSK-STR system 500 may be based on the piecewise linear model described hereinbelow. A piecewise linear timing disturbance model may be expressed using the state vector $\theta_k = [\tau_k f_k]^T$ where $\tau_k$ is the phase offset at channel bit k and $f_k$ is the frequency offset as follows:

$$\theta_{k+1} = \begin{bmatrix} \tau_{k+1} \\ f_{k+1} \end{bmatrix} = \begin{bmatrix} 1 & 1 \\ 0 & 1 \end{bmatrix} \begin{bmatrix} \tau_k \\ f_k \end{bmatrix} + \begin{bmatrix} 0 \\ w_k \end{bmatrix} = F\theta_k + \begin{bmatrix} 0 \\ w_k \end{bmatrix} \quad (6)$$

where $w_k$, a nonstationary random process, is the driving noise and $$F = \begin{bmatrix} 1 & 1 \\ 0 & 1 \end{bmatrix}.$$

In Eq. (6), it is assumed that the sampling interval is normalized by the channel clock to one, for example. For a piecewise linear timing disturbance model using a segment of size M, $w_k$ is zero except at integer multiples of M where $w_k$ may assume nonzero values. That is, $w_k$ is used to randomize the frequency offsets $f_k$ in various segments. In each segment, however, the frequency offset $f_k$ is assumed to be constant. In Eq. (6) it is also assumed that the timing disturbance in a segment is due to the frequency offset in that segment. The variance of the initial frequency offset in each segment is $\sigma_f^2$ and the variance of the initial phase offset in each segment is $\sigma_\tau^2$. In one embodiment of the present invention the TED 520, 522 may be used to extract the timing error information. Assuming a linear transfer function of the TED 520, 522, the linear timing error observation model may be described as follows:

$$y_k = [KPD\ 0]\theta_k + v_k = H\theta_k + v_k = KPD \times \tau_k + v_k \quad (7)$$

where $y_k$ is the observed noisy timing offset which is the output of the TED 520, 522, H=[KPD 0], and KPD is the gain of the TED 520, 522. Noise $v_k$ represents the output jitter of the TED 520, 522 and is modeled as additive white Gaussian noise (AWGN) with variance $\sigma_v^2$.

In one embodiment, Kalman filter 512, 514 may be used to provide an optimum estimation of $\tau_k$, the timing disturbance at channel bit k, in the sense of a Minimum Mean Squared Error (MMSE) for the timing disturbance model described in Eq. (6) when the driving noise $w_k$ is stationary and the timing error observation model is linear as expressed in Eq. (7).

Figure 3:
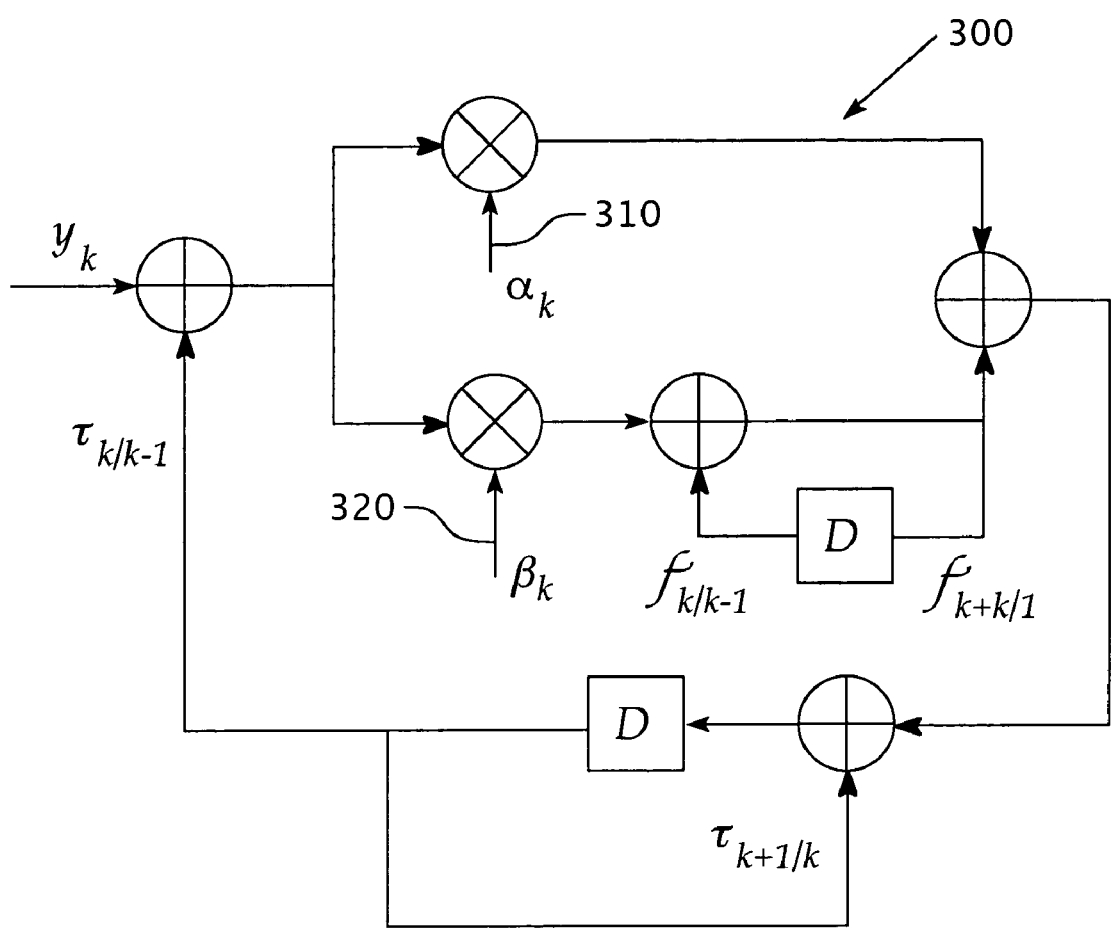
FIG. 3 is a block diagram illustrating the relationship between a Kalman filter and a PLL.

FIG. 3 is a block diagram 300 of the relationship between a Kalman filter and a PLL. In one embodiment, a Kalman filter may be used to model a PLL. The closed form expressions for the phase update gain $\alpha_k$ (PUGs) 310 and the frequency update gain $\beta_k$ (FUGs) 320 may be derived when the driving noise $w_k$ is zero. Throughout this description the phase update gain $\alpha_k$ 310 and the frequency update gain $\beta_k$ 320 are sometimes referred to as the "Kalman gains." In a piecewise linear model, the timing disturbance may be divided into segments of size M. Because $w_k$ is zero within a segment except at integer multiples of M, the driving noise is zero within the segment, and, therefore, the nonzero driving noise $w_k$ at integer multiples of M may be treated as the initial frequency offset $f_0$ for the segment. Kalman gains of the piecewise linear timing disturbance model in accordance with one embodiment of the present invention may be written as:

$$\begin{bmatrix} \alpha_k \\ \beta_k \end{bmatrix} = \frac{1}{\sigma_v^2 c_m} \begin{bmatrix} \frac{1}{KPD}\left(\frac{m^2\sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix} \quad (8)$$

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2} \quad (9)$$

$$m = k \bmod M \quad (10)$$

where k is the bit index, M is the size, $\sigma_v^2$ is the variance of the output jitter of the TED 18, $\sigma_\tau^2$ is the variance of the initial phase error in each small segment, and $\sigma_f^2$ is the variance of the initial frequency error in each small segment, i.e., $\sigma_f^2$ the variance of the nonzero value of the nonstationary driving noise $w_k$. m is the normalized bit index in each segment. In one embodiment, the phase update gain $a_k$ 310 and the frequency update gain $\beta_k$ 320 follow from each of the segmented Kalman filters 512, 514.

Figure 4:
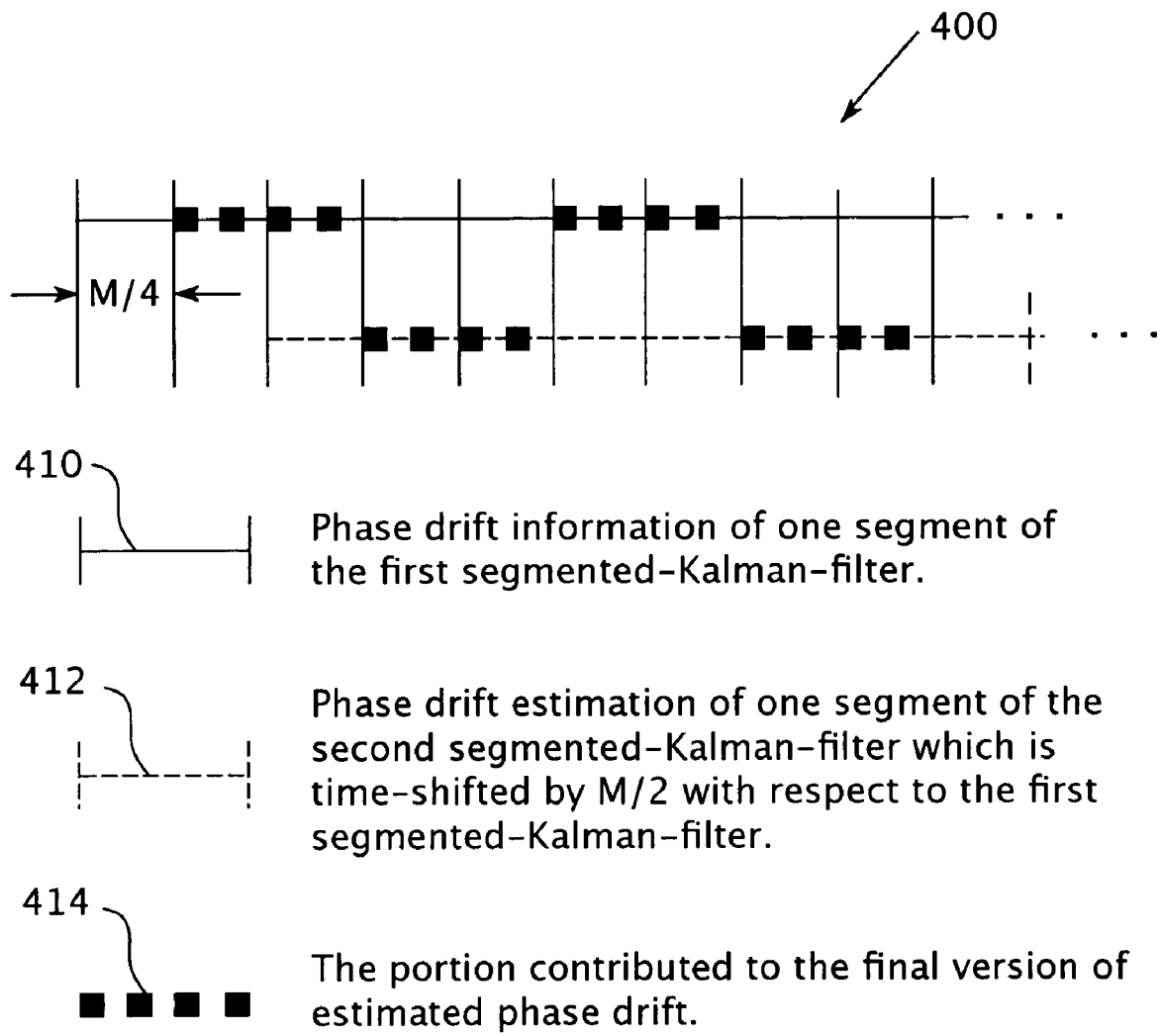
FIG. 4 illustrates a relationship between timing disturbance estimations of two intertwined segmented-Kalman filters.

According to one embodiment, two intertwined segmented Kalman filters 512, 514 may be used to provide an estimate of the timing disturbance $\tau_k$. This general scheme is referred throughout the description as the "dual segmented Kalman filters timing recovery (DSK-STR)" scheme. FIG. 4 illustrates the relationship between the timing disturbance estimates $\tau_k$ provided by the two intertwined segmented Kalman filters 512, 514. The solid line 410 in diagram 400 represents the timing disturbance estimate $\tau_k$ of one segment of the first segmented Kalman filter 512, for example. The dashed line 412 represents the timing disturbance estimate $\tau_k$ of one segment of the second segmented Kalman filter 514, which is shifted in time by M/2 with respect to the first segmented Kalman filter 514. The large dotted line 414 represents the portion contributed to the final version of the estimated timing disturbance $\tau_k$. Because the two segmented Kalman filters 512, 514 are shifted in time by M/2 bit intervals relative to each other, Eq. (12) may be used to calculate Kalman gains $a_k$ and $\beta_k$ for the first Kalman filter 512, while for the other filter, Eq. (12) may be modified for the second Kalman filter 514 as follows:

$$M = (m - M/2) \bmod M \quad (11)$$

where Eq. (13) may be used to calculate Kalman gains $\alpha_k$ and $\beta_k$ for the second Kalman filter 514. For each segment, each of the first and second Kalman filters 512, 514 may use the timing disturbance and the frequency offset states of the other filter as its initial states. Moreover, each of the first and second Kalman filters 512, 514 may alternatively contribute to the final version of the estimated timing disturbance $\tau_k$ when $m \in [M/4, 3M/4]$.

As illustrated in the embodiment of FIG. 5, each branch of the DSK-STR system 500 may include its own equalizer 516, 518, TED 520, 522, loop filter 524, 526, pre-calculated PUG/FUG look-up tables 528, 530, 532, 534, digital integrator 536, 538, phase register 540, 542, frequency register 544, 546, and VCO 548, 550. According to other embodiments, more than two segmented branches may used.

The two branches 502, 504 may share one simple data detector 546. For the dual segmented Kalman filters 512, 514 the PUG and FUG values may be pre-calculated using Eq. (10) and then stored in memory in the form of a look-up table. Those skilled in the art will appreciate that Eqs. (12) and (13) may be used for the two different Kalman filters 512, 514, respectively. At each sampling clock instant, the PUG and FUG values provided to the Kalman filters 512, 514 may be updated according to the values stored in the look-up tables 528, 530, 532, 534. The two Kalman filters 512, 514 may control the digitally controlled VCOs 548, 550 respectively. The VCOs 548, 550 may sample the continuous readback signal. The equalizers 516, 518 subsequently may equalize the continuous readback signal samples. Control logic may be used to determine which Kalman filter 512, 514 outputs the estimated timing disturbance in accordance with the technique shown in FIG. 4 and may select as an output the corresponding equalized continuous readback signal samples to the advanced data detector via line 552. The selected equalized continuous readback signal samples may also be passed to the simple data detector 546 and may provide preliminary decisions for the TEDs 520, 522. In turn, the TEDs 520, 522 may generate the necessary timing error information for the dual segmented Kalman filters 512, 514, respectively.

For each segmented Kalman filter 512, 514, at the beginning of each segment the contents of the phase register 540, 542 and frequency register 544, 546 may be initialized using the contents of the corresponding registers of the other segmented Kalman filter 514, 512, respectively. For example, for the Kalman filter 512, at the beginning of each segment, the contents of the phase register 540 and frequency register 544 are initialized using the contents of the corresponding phase register 542 and frequency register 546 of the other segmented Kalman filter 514. Alternatively, for the Kalman filter 514, at the beginning of each segment, the contents of the phase register 542 and frequency register 546 are initialized using the contents of the corresponding phase register 540 and frequency register 544 of the other segmented Kalman filter 512.

The process associated with the DSK-STR system 500 illustrated in FIG. 5 will now be described in terms of the following example. Those skilled in the art will appreciate, however, that the scope of the present invention is not to be limited thereto. Assuming that at a time instant k the kth bit in the continuous readback signal is to be sampled by the VCOs 548, 550. First, the PUG and FUG values of the two Kalman filters 512, 514 are updated according to the values stored in the pre-calculated look-up tables 528, 530, 532, 534 associated with each Kalman filter 512, 514, respectively. The two VCOs 548, 550, then sample the continuous readback signal and the two equalizers 516, 518 equalize the samples. The m values for the two different branches 502, 504 of the DSK-STR system 500 are calculated using Eqs. (12) and (13) respectively. There may be one $m \in [M/4, 3M/4]$ among the two m values. The outputs of each equalizer 516, 518 are provided to a multiplexer (e.g., 2 to 1 selector) 517. For example, the multiplexer 517 may select the output of the equalizer 516 of branch 502 (the active branch), as the synchronized output equalized samples to be supplied to the advanced data detector via line 552. If the m value of the other branch 504 (the inactive branch) happens to be zero, for example, the contents of the phase register 542 and frequency register 546 of the inactive branch 504 are refreshed using the contents of the corresponding phase register 540 and frequency register 544 of the active branch 502. The multiplexer 517 also passes the selected equalized samples of the continuous readback signal to the shared simple data detector 546. In one embodiment, the shared simple data detector 546 may be a Viterbi detector or, in another embodiment, a SOVA detector with short decision delay. The TEDs 520, 522 each receive two inputs. One is the preliminary decision made by the simple data detector 546. The other input is the equalized sample of the continuous readback signal in its own branch.

The following procedure may be the same for both branches 502, 504 of the DSK-STR system 500. The low pass loop filters 524, 526 filter the timing error information from the TEDs 520, 522, respectively. The instantaneous bandwidth of the low pass loop filters 524, 526 is controlled by the updated PUG/FUG values received by the look-up tables 528, 530, 532, 534. The timing error information is then integrated by the digital integrators 536, 538, and converted to a time signal by the digitally controlled VCOs 548, 550. The time instant k is then incremented by one and the whole process is repeated recursively until the end of the sector.

Although the previous example was described with reference to two offset segmented Kalman filters 512, 514 and using the central 50% portion of the timing disturbance estimates from each segmented Kalman filter 512, 514 as shown in FIG. 4, the present invention may be extended to using more than two segmented Kalman filters and using a central portion of timing disturbance estimates from each filter, as mentioned previously.

The scope of one embodiment of the present invention may be further illustrated with reference to the following example based on a Monte-Carlo simulation of one embodiment of the DSK-STR system 500. In the present example, the Monte-Carlo simulation utilizes a Lorentzian magnetic recording channel model at normalized channel density of 2.5 such that the channel pulse response may be given by:

$$h(t) = \frac{1}{1+\left(\frac{2t}{PW50}\right)^2} - \frac{1}{1+\left(\frac{2(t-T)}{PW50}\right)^2} \quad (12)$$

and the channel bit interval may be T=PW50/2.5. In the example, sinusoidal timing disturbances with a period of 5,000 bits and amplitude of one bit interval were introduced into the simulated readback waveform. Twenty times over sampling was used in the simulation to mimic a continuous-time waveform. In the current simulation example, an EPR4 target (i.e., $1-D-D^2-D^3$) was chosen as the PR target. A floating point Finite Impulse Response (FIR) filter with eleven coefficients was used as the equalizer 516, 518 and they were trained using a least mean squares (LMS) algorithm. An LDPC code was used with a $^{16}/_{17}$ rate and a codeword size of 4352 (i.e., 4096×17/16) bits was assumed. A BCJR algorithm was used to perform the channel detection. There were five iterations between the turbo equalizer and the LDPC decoder, and 30 were used iterations within the sum-product algorithm used for LDPC decoding. The SNR may be defined as the ratio of the power of the pulse response to the noise power. The length of the preamble was chosen as 100 bits for the example. A Kalman filter based timing acquisition scheme in accordance with one embodiment of the present invention was used for the acquisition mode.

In order to separate the acquisition and tracking aspects of the timing recovery in the current simulation example a perfect initial frequency offset acquisition was presumed. In the simulation, this assumption may be achieved by always starting the sinusoidal timing disturbance with a zero instantaneous slope. For the case of conventional hard decision directed M&M type TEDs, a Viterbi detector with a detection window of eight bit intervals was used as the simple data detector 546 as shown in FIG. 5, while a SOVA detector with detection window of eight bit intervals was used for the SDD-TED embodiment. The segment size M for the DSK-STR system 500 was optimized to 200 bits by estimating the loss of lock rate for the various M values. In the simulations, a loss of lock of the sector was declared whenever more than 50% of the bytes in a sliding observation window of 50 bytes are in error. These parameters were chosen such that the loss of lock miss rate and the loss of lock false alarm rate are negligible compared to the actual loss lock rate due to the residual timing jitter. In other words, the fraction of loss of lock events that are not identified by the loss of lock detector and the fraction of events that are flagged by the loss of lock detector but are not actually loss of lock events, were chosen so as to be negligible as compared to the actual loss of lock rate due to the residual timing jitter.

Figure 6:
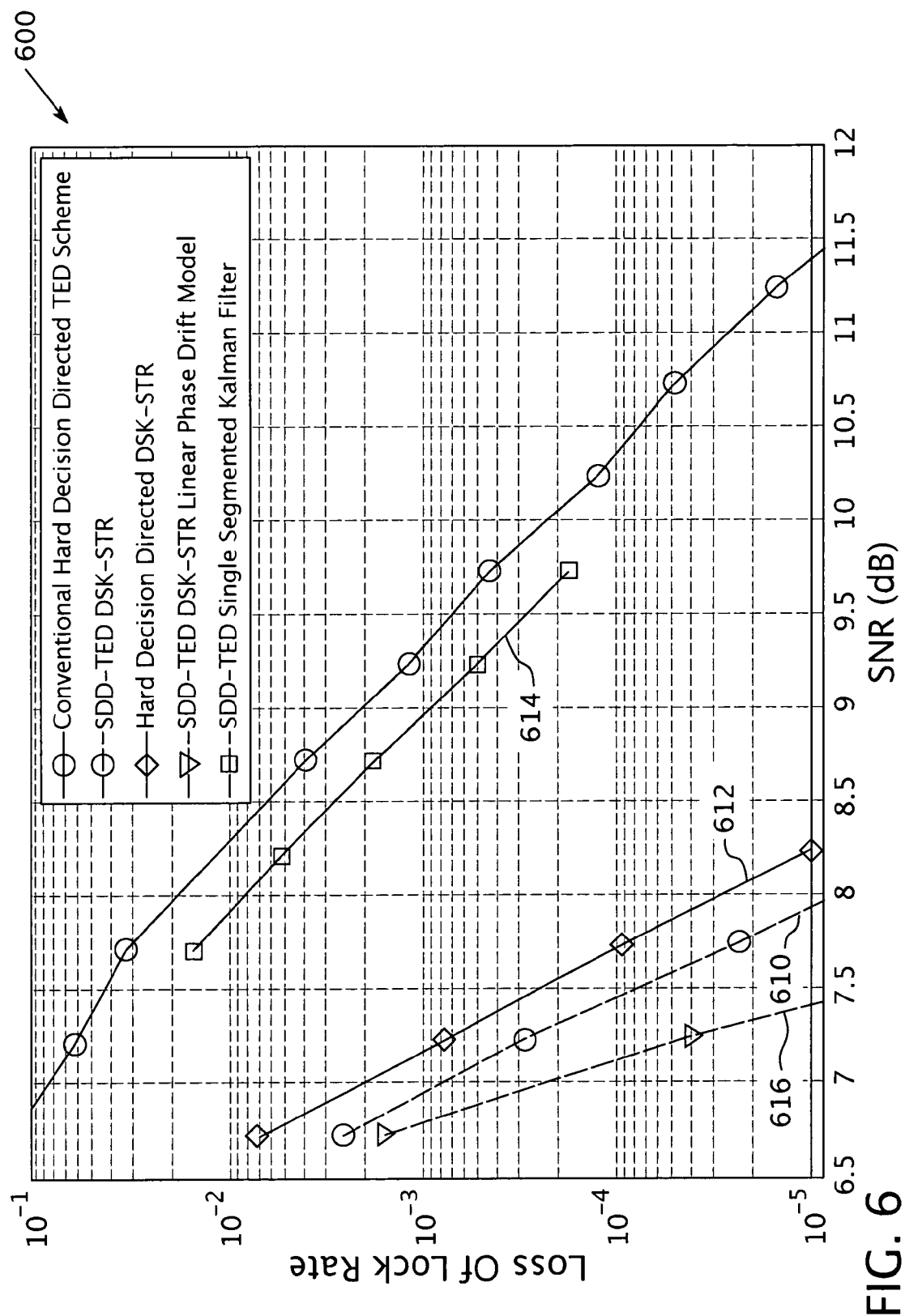
FIG. 6 is a diagram representing a loss of lock rate as a function of SNR for different timing recovery schemes.

FIG. 6 is a diagram 600 representing the loss of lock rate as a function of SNR for different timing recovery schemes using the above described exemplary parameters. It is seen that the performance of the SDD-TED DSK-STR for the sinusoidal timing disturbance model 610 of an embodiment of the present invention is about 3.5 dB better than that of the conventional timing recovery scheme for a target loss of lock rate of $1 \times 10^{-5}$ FIG. 6 also indicates that a 0.25 dB gain in performance may be achieved with the present invention when using the SDD-TED DSK-STR sinusoidal timing disturbance 610 as compared to the hard decision directed TED based DSK-STR 612. The loss of lock performance of the SDD-TED DSK-STR linear timing disturbance model 616 of the present invention provides an additional 0.6 dB improvement in performance over the sinusoidal model 610 when the phase drift is linear. This is an expected result given that the design of the DSK-STR system 500 is based on a piecewise linear assumption.

Figure 7:
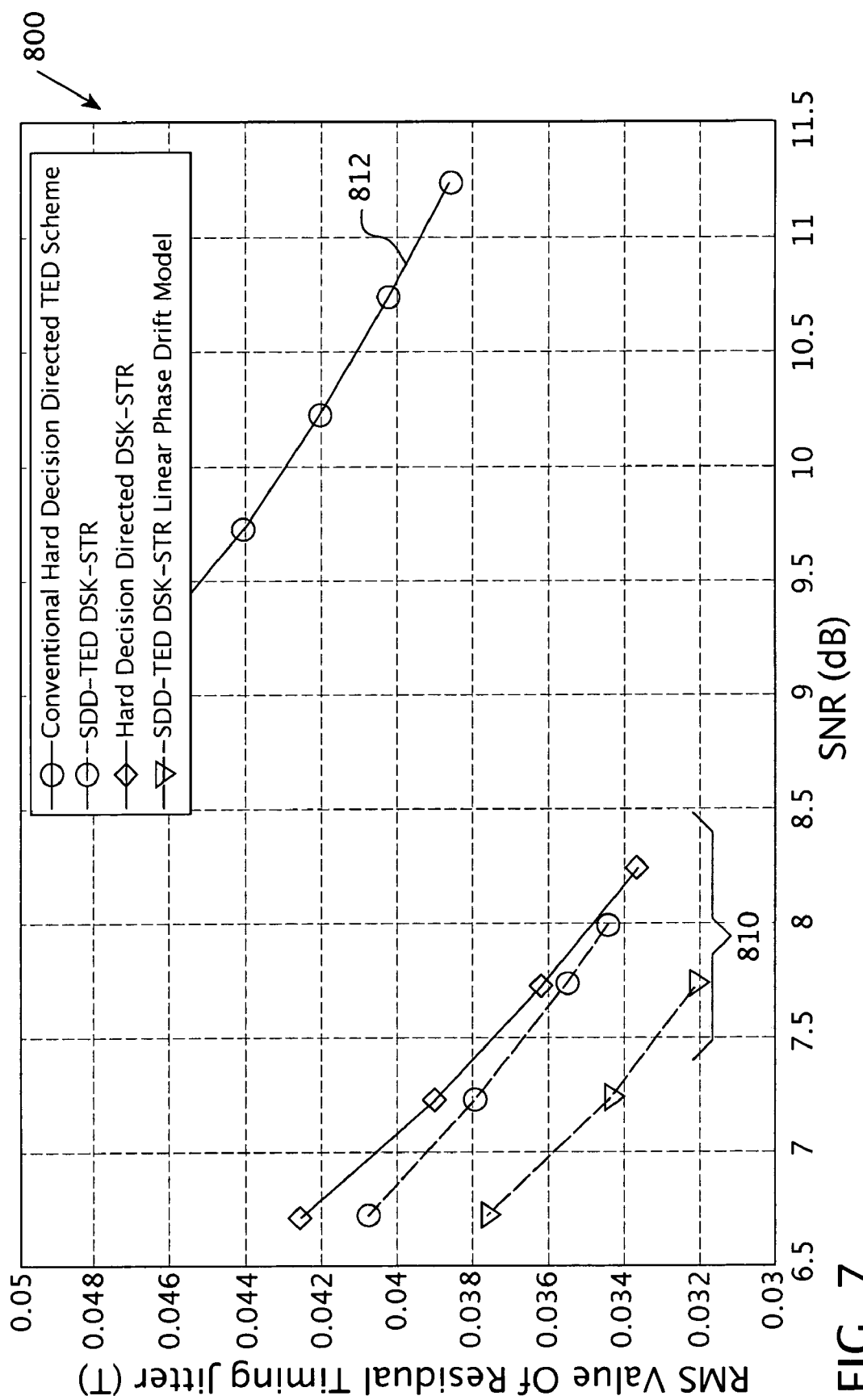
FIG. 7 is a diagram of the RMS value of residual timing jitter versus SNR for different timing recovery schemes.

FIG. 7 illustrates a diagram 800 showing the RMS value of the residual timing jitter as a function of SNR for different timing recovery schemes. It is seen that the residual timing jitter of the DSK-STR schemes 810 of the present invention is much smaller than that of the conventional scheme 812.

Those of ordinary skill in the art will recognize that many modifications and variations of the present invention may be implemented. The foregoing description and the following claims are intended to cover all such modifications and variations. Furthermore, the materials and processes disclosed are illustrative, but are not exhaustive. Other materials and processes may also be used to make devices embodying the present invention.

What is claimed is:

1. A tracking method for providing timing recovery of continuous signals, comprising:
   sampling a continuous signal;
   estimating a timing disturbance of the sampled continuous signal by filtering the sampled continuous signal with first and second segmented Kalman filters;
   generating a timing adjustment signal in accordance with the estimated timing disturbance; and
   adjusting a sampling signal associated with a sampling device based on the timing adjustment signal.

2. The method of claim 1, further comprising updating the first and second segmented Kalman filters at each sampling instant with a phase update gain and a frequency update gain.

3. The method of claim 2, wherein the first and second segmented Kalman filters at each sampling instant includes updating the phase update gain and the frequency update gain from a look-up table.

4. The method of claim 2, wherein the phase update gain and the frequency update gain for the first and second Kalman filters are calculated according to:

$$\begin{bmatrix} \alpha_k \\ \beta_k \end{bmatrix} = \frac{1}{\sigma_v^2 c_m} \begin{bmatrix} \frac{1}{KPD}\left(\frac{m^2 \sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix}$$

wherein k is a bit index, M is a segment size, $\sigma_v^2$ is a variance of a timing offset, $\sigma_\tau^2$ is a variance of an initial timing error in the segment, $\sigma_f^2$ is a variance of an initial frequency error in each of a plurality of segments, and KPD is a gain of a timing error detector; and
wherein:

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2}$$

and wherein m=k mod M.

5. The method of claim 2 wherein updating the first and second segmented Kalman filters at each sampling instant includes updating the phase update gain and the frequency update gain of the first Kalman filter according to m=k mod M and updating the phase update gain and the frequency update gain of the second Kalman filter according to M=(m−M/2) mod M, wherein the first and second segmented Kalman filters are shifted in time by M/2 bit intervals relative to each other, wherein k is a bit index and M is a segment size.

6. The method of claim 1, further comprising for each of the first and second segmented Kalman filters, at the beginning of a segment, initializing a first phase register and a first frequency register of the first segmented Kalman filter according to the contents of a corresponding second phase register and a corresponding second frequency register of the second segmented Kalman filter, respectively.

7. The method of claim 1, wherein sampling the continuous signal includes sampling the continuous signal with a first and second voltage controlled oscillators to thereby obtain the sampled version of the continuous signal, wherein the first voltage controlled oscillator is controlled by the first Kalman filter and the second voltage controlled oscillator is controlled by the second Kalman filter.

8. The method of claim 1, further comprising equalizing the sampled version of the continuous signal to thereby generate an equalized sampled version of the continuous signal.

9. The method of claim 8, wherein equalizing the sampled version of the continuous signal includes equalizing the sampled version of the continuous signal according to a finite impulse response filter.

10. The method of claim 8, further comprising:
providing the equalized sampled version of the continuous signal to a data detector; and
generating, with the data detector, preliminary bit estimates corresponding to the equalized sampled version of the continuous signal.

11. The method of claim 10, further comprising providing the preliminary bit estimates to a timing error detector.

12. The method of claim 11, wherein generating the timing adjustment signal includes generating the timing adjustment signal from the preliminary bit estimates and the equalized sampled version of the continuous signal.

13. A tracking method for providing timing recovery of continuous signals, comprising:
sampling a continuous signal;
estimating a timing disturbance of the sampled continuous signal, wherein estimating the timing disturbance of the continuous signal includes Kalman filtering the sampled version of the continuous signal by at least two segmented Kalman filters;
generating a timing adjustment signal in accordance with the estimated timing disturbance; and
adjusting a sampling signal associated with a sampling device based on the timing adjustment signal.

14. A tracking method for providing timing recovery of continuous signals, comprising:
estimating a timing disturbance of a sampled continuous signal at a predetermined sampling instant by filtering the sampled continuous signal with a first and second segmented Kalman filters, the sampled continuous signal comprising a plurality of sectors, wherein each sector comprises one or more segments of a predetermined number of bits (M);
estimating a timing offset signal at a corresponding channel bit of the sampled continuous signal; and
generating a timing adjustment signal based on the timing offset signal.

15. The method of further claim 14, further comprising providing the phase update gain and the frequency update gain to each of the first and second Kalman filters at the sampling instant.

16. The method of claim 15, further comprising determining the phase update gain and the frequency update gain provided to each of the first and second Kalman filters according to:

$$\begin{bmatrix} \alpha_k \\ \beta_k \end{bmatrix} = \frac{1}{\sigma_v^2 c_m} \begin{bmatrix} \frac{1}{KPD}\left(\frac{m^2 \sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix}$$

wherein k is a bit index, M is a segment size, $\sigma_f^2$ is a variance of the timing offset, $\sigma_\tau^2$ is a variance of an initial timing error in the segment, $\sigma_f^2$ is a variance of an initial frequency error in each of a plurality of segments, and KPD is a gain of a timing error detector; and
wherein:

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2}$$

and wherein m =k mod M.

17. The method of claim 15, wherein providing the first and second segmented Kalman filters with the phase update gain and the frequency update gain at the sampling instant includes updating the phase update gain and the frequency update gain of the first Kalman filter according to m=k mod M and updating the phase update gain and the frequency update gain of the second Kalman filter according to M=(m−M/2) mod M, wherein the first and second segmented Kalman filters are shifted in time by M/2 bit intervals relative to each other, wherein k is a bit index and M is a segment size.

18. The method of claim 15, further comprising, at a starting portion of each segment, initializing a first phase register and a first frequency register associated with the first Kalman filter with the contents of a second phase register and a second frequency register associated with the second Kalman filter.

19. The method of claim 14, further comprising:
sampling a continuous signal with a voltage controlled oscillator to thereby generate the sampled continuous signal; and
controlling the voltage controlled oscillator based on the timing adjustment signal based on the timing offset signal.

20. The method of claim 14, further comprising equalizing the sampled continuous signal.

21. The method of claim 20, further comprising generating a timing error signal by providing the equalized samples of the continuous signal to a timing error detector for generating the timing error signal.

22. The method of claim 21, wherein generating the timing error signal includes generating the timing error signal according to a linear model, wherein the linear model is expressed as:

$$y_k = [KPD\ 0]\theta_k + v_k = KPD \times \tau_k + v_k$$

wherein $y_k$ is an observed noisy timing offset which is the output of the timing error detector, H=[KPD 0], KPD is a gain of the timing error detector, $v_k$ represents output jitter of the timing error detector, and $\tau_k$ is the timing offset.

23. A tracking method for providing timing recovery of continuous signals, comprising:
estimating a timing disturbance of a sampled continuous signal at a predetermined sampling instant, the sampled continuous signal comprising a plurality of sectors, wherein each sector comprises one or more segments of a predetermined number of bits (M), wherein estimating the timing offset signal includes filtering the sampled continuous signal with at least two segmented Kalman filters;
estimating a timing offset signal at a corresponding channel bit of the sampled continuous signal; and
generating a timing adjustment signal based on the timing offset signal.

24. A tracking system for providing timing recovery of continuous signals, comprising:
a sampling device for sampling the continuous signal; and
a filter in communication with the sampling device, wherein the filter comprises first and second segmented Kalman filters, and wherein the filter is for:
estimating a timing disturbance of the continuous signal;
generating a timing adjustment signal in accordance with the estimated timing disturbance; and
adjusting a sampling signal associated with the sampling device to obtain a sampled version of the continuous signal based on with the timing adjustment signal.

25. The system of claim 24, wherein the first and second Kalman filters are for estimating a timing offset at a predetermined channel bit of the sampled version of the continuous signal.

26. The system of claim 25, wherein the first and second segmented Kalman filters are updated at each sampling instant with a phase update gain and a frequency update gain.

27. The system of claim 26, wherein the first and second segmented Kalman filters are updated at each sampling instant with the phase update gain and the frequency update gain based on a look-up table.

28. The system of claim 26, wherein the phase update gain and the frequency update gain for the first and second Kalman filters are calculated according to:

$$\begin{bmatrix} \alpha_k \\ \beta_k \end{bmatrix} = \frac{1}{\sigma_v^2 c_m} \begin{bmatrix} \frac{1}{KPD}\left(\frac{m^2\sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix}$$

wherein k is a bit index, M is a segment size, $\sigma_v^2$ is a variance of a timing offset, $\sigma_\tau^2$ is a variance of an initial timing error in a segment, $\sigma_f^2$ is a variance of an initial frequency error in each of a plurality of segments, and KPD is a gain of a timing error detector; and
wherein:

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2}$$

and wherein m=k mod M.

29. The system of claim 28, wherein at each sampling instant the first segmented Kalman filter includes the phase update gain and the frequency update gain determined according to m=k mod M and the second segmented Kalman filter includes the phase update gain and the frequency update gain determined according to M=(m−M/2) mod M, wherein the first and second segmented Kalman filters are shifted in time by M/2 bit intervals relative to each other.

30. The system of claim 25, further comprising:
a first phase register in communication with the first Kalman filter;
a first frequency register in communication with the first Kalman filter;
a second phase register in communication with the second Kalman filter; and
a second frequency register in communication with the second Kalman filter, wherein, at the beginning of a segment, the first phase register is initialized according to the contents of the second phase register and the first frequency register is initialized according to the contents of the second frequency register.

31. The system of claim 25, wherein the sampling device comprises first and second voltage controlled oscillators, wherein the first voltage controlled oscillator is controlled by the first Kalman filter and the second voltage controlled oscillator is controlled by the second Kalman filter.

32. The system of claim 25, further comprising an equalizer in communication with the sampling device for generating an equalized sampled version of the continuous signal.

33. The system of claim 32, wherein the equalizer is a finite impulse response filter.

34. The system of claim 32, further comprising a data detector for generating preliminary bit estimates corresponding to the equalized sampled version of the continuous signal.

35. The system of claim 34, further comprising a timing error detector in communication with the equalizer, wherein the preliminary bit estimates are provided to the timing error detector.

36. The system of claim 35, wherein the timing error detector is for generating the timing adjustment signal from the preliminary bit estimates and the equalized sampled version of the continuous signal.

37. A tracking system for providing timing recovery of a continuous signal, comprising a filter, wherein the filter comprises first and second segmented Kalman filters, and wherein the filter is for:
receiving an estimated timing disturbance signal of a sampled version of the continuous signal at a predetermined sampling instant, the sampled version of the continuous signal comprising a plurality of sectors, each sector comprising one or more segments of a predetermined number (M) of bits;
estimating a timing offset signal at a corresponding channel bit of a sampled continuous signal; and
generating a timing adjustment signal based on the timing offset signal.

38. The system of claim 37, wherein a phase update gain and a frequency update gain are provided to each of the first and second segmented Kalman filters at the predetermined sampling instant.

39. The system of claim 38, wherein the phase update gain and the frequency update gain provided to each of the first and second segmented Kalman filters are determined according to:

$$\begin{bmatrix} \alpha_k \\ \beta_k \end{bmatrix} = \frac{1}{\sigma_v^2 c_m} \begin{bmatrix} \frac{1}{KPD}\left(\frac{m^2 \sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix}$$

wherein k is a bit index, M is a segment size, $\sigma_v^2$ is a variance of the timing offset, $\sigma_\tau^2$ is a variance of an initial timing error in a segment, $\sigma_f^2$ is a variance of an initial frequency error in each of a plurality of segments, and KPD is a gain of a timing error detector; and
wherein:

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2}$$

and wherein m k mod M.

40. The system of claim 39, wherein the phase update gain and the frequency update gain of the first Kalman filter are updated according to m=k mod M and the phase update gain and the frequency update gain of the second Kalman filter are updated according to M=(m−M/2) mod M; and
wherein the first and second segmented Kalman filters are shifted in time by M/2 bit intervals relative to each other.

41. The system of claim 38, wherein the filter further comprises:
a first phase register in communication with the first Kalman filter;
a first frequency register in communication with the first Kalman filter;
a second phase register in communication with the second Kalman filter; and
a second frequency register in communication with the second Kalman filter, wherein, at the beginning of a segment, the first phase register is initialized according to the contents of the second phase register and the first frequency register is initialized according to the contents of the second frequency register.

42. The system of claim 37, further comprising a voltage controlled oscillator in communication with the filter for sampling the continuous signal, wherein the voltage controlled oscillator is controlled by the timing adjustment signal based on the timing offset signal.

43. The system of claim 37, further comprising an equalizer in communication with the filter for equalizing the sampled continuous signal.

44. The system of claim 43, further comprising a timing error detector in communication with the equalizer, wherein the timing error detector is for generating a timing error signal based on the equalized samples of the continuous signal.

45. The system of claim 44, wherein the timing error signal is generated according to a linear model, wherein the lined model is expressed as:

$$y_k = [KPD\ 0]\theta_k + v_k = H\theta_k + v_k = KPD \times \tau_k + v_k$$

wherein $y_k$ is an observed noisy timing offset which is the output of the timing error detector, H=[KPD 0], KPD is a gain of the timing error detector, $v_k$ represents output jitter of the timing error detector, and $\tau_k$ is the timing offset.

46. A filter for a timing recovery system, comprising:
means for receiving an estimated timing disturbance signal of a sampled version of the continuous signal at a predetermined sampling instant, the sampled version of the continuous signal comprising a plurality of sectors, each sector comprising one or more segments of a predetermined number (M) of bits;
means for estimating a timing offset signal at a corresponding channel bit of a sampled continuous signal;
means for generating a timing adjustment signal based on the timing offset signal;
means for providing a phase update gain to the filter; and
means for providing a frequency update gain to the filter at the predetermined sampling instant, wherein the phase update gain and the frequency update gain provided to the filter are determined according to:

$$\begin{bmatrix} \alpha_k \\ \beta_k \end{bmatrix} = \frac{1}{\sigma_v^2 c_m} \begin{bmatrix} \frac{1}{KPD}\left(\frac{m^2 \sigma_v^2}{\sigma_\tau^2} + \frac{\sigma_v^2}{\sigma_f^2} + \frac{m(m+1)(2m+1)}{6}\right) \\ \frac{1}{KPD}\left(\frac{m\sigma_v^2}{\sigma_\tau^2} + \frac{m(m+1)}{2}\right) \end{bmatrix}$$

wherein k is a bit index, M is a segment size, $\sigma_v^2$ is a variance of the timing offset, $\sigma_\tau^2$ is a variance of an initial timing error in a segment, $\sigma_f^2$ is a variance of an initial frequency error in each of a plurality of segments, and KPD is a gain of a timing error detector; and wherein:

$$c_m = \frac{\sigma_v^2}{\sigma_\tau^2 \sigma_f^2} + \frac{m(m+1)(2m+1)}{6\sigma_\tau^2} + \frac{m+1}{\sigma_f^2} + \frac{m(m+1)^2(m+2)}{12\sigma_v^2}$$

and wherein m=k mod M.

47. The filter of claim 46, wherein the filter further comprises:
 first means for filtering; and
 second means for filtering in communication with the first means for filtering;
 wherein the phase update gain and the frequency update gain of the first means for filtering are updated according to m=k mod M and the phase update gain and the frequency update gain of the second means for filtering are updated according to M=(m−M/2) mod M; and
 wherein the first and second means for filtering are shifted in time by M/2 bit intervals relative to each other.

48. The filter of claim 47, wherein the filter comprises first and second segmented means for filtering.

49. The filter of claim 48, wherein the first means for filtering includes a first Kalman filter, and the second means for filtering includes a second Kalman filter.

50. The filter of claim 48, wherein a phase update gain and a frequency update gain are provided to each of the first and second segmented means for filtering at the predetermined sampling instant.

51. The filter of claim 50, wherein the filter further comprises:
 a first means for storing in communication with the first segmented means for filtering;
 a second means for storing in communication with the first segmented means for filtering;
 a third means for storing in communication with the second segmented means for filtering; and
 a fourth means for storing in communication with the second segmented means for filtering;
 wherein, at the beginning of a segment, the first means for storing is initialized according to the contents of the third means for storing and the second means for storing is initialized according to the contents of the fourth means for storing.

52. The filter of claim 48, further comprising sampling means in communication with the filter for sampling the continuous signal, wherein the sampling means is controlled by the timing adjustment signal in based on with the timing offset signal.

53. The filter of claim 48, further comprising means for equalizing in communication with the filter for equalizing the sampled continuous signal.

54. The filter of claim 53, further comprising means for detecting timing errors in communication with the means for equalizing, wherein the means for detecting timing errors is for generating a timing error signal based on the equalized samples of the continuous signal.

55. The filter of claim 54, wherein the timing error signal is generated according to a linear model, wherein the linear model is expressed as:

$$y_k = [KPD\ 0]\theta_k + v_k = H\theta_k + v_k = KPD \times \tau_k + v_k$$

wherein $y_k$ is an observed noisy timing offset which is the output of the error detection means, H =[KPD 0], KPD is a gain of the means for detecting timing errors, $V_k$ represents output jitter of the means for detecting timing errors, and $\tau^k$ is the timing offset.

56. A tracking system for providing timing recovery of a continuous signal, the system comprising:
 a filter comprising:
  means for receiving an estimated timing disturbance signal of a sampled version of the continuous signal at a predetermined sampling instant, the sampled version of the continuous signal comprising a plurality of sectors, each sector comprising one or more segments of a predetermined number (M) of bits;
  means for estimating a timing offset signal at a corresponding channel bit of a sampled continuous signal, wherein the means for estimating comprises first and second Kalman filters;
  means for generating a timing adjustment signal based on the timing offset signal; and
 sampling means in communication with the filter for sampling the continuous signal, wherein the means for sampling is controlled by the timing adjustment signal based on the timing offset signal.

57. The system of claim 56, further comprising a means for equalizing in communication with the means for filtering for equalizing the sampled continuous signal.

58. The system of claim 57, further comprising means for detecting timing errors in communication with the means for equalizing, wherein the means for detecting timing errors is for generating a timing error signal based on the equalized samples of the continuous signal.

59. The system of claim 57, wherein the timing error signal is generated according to a linear model, wherein the linear model is expressed as:

$$y_k = [KPD\ 0]\theta_k + v_k = H\theta_k + v_k = KPD \times \tau_k + v_k$$

wherein $y_k$ is an observed noisy timing offset which is the output of the means for detecting timing errors, H=[KPD 0], KPD is a gain of the means for detecting timing errors, $v_k$ represents output jitter of the means for detecting timing errors, and $\tau_k$ is the timing offset.

60. A tracking method for providing timing recovery of continuous signals, comprising:
 estimating a timing disturbance of a sampled continuous signal at a predetermined sampling instant, the sampled continuous signal comprising a plurality of sectors, wherein each sector comprises one or more segments of a predetermined number of bits (M);
 estimating a timing offset signal at a corresponding channel bit of the sampled continuous signal;
 generating a timing adjustment signal based on the timing offset signal;
 equalizing the sampled continuous signal; and
 generating a timing error signal by providing the equalized samples of the continuous signal to a timing error detector for generating the timing error signal, wherein generating the timing error signal includes generating the timing error signal according to a linear model, wherein the linear model is expressed as:

$$y_k = [KPD\ 0]\theta_k + v_k = H\theta_k + v_k = KPD \times \tau_k + v_k$$

wherein $y_k$ is an observed noisy timing offset which is the output of the timing error detector, H=[KPD 0], KPD is a gain of the timing error detector, $v_k$ represents output jitter of the timing error detector, and $\tau_k$ is the timing offset.

61. A tracking system for providing timing recovery of a continuous signal, comprising:
 a filter for:
  receiving an estimated timing disturbance signal of a sampled version of the continuous signal at a predetermined sampling instant, the sampled version of the continuous signal comprising a plurality of sectors each sector comprising one or more segments of a predetermined number (M) of bits;

estimating a timing offset signal at a corresponding channel bit of a sampled continuous signal; and generating a timing adjustment signal based on the timing offset signal;

an equalizer in communication with the filter for equalizing the sampled continuous signal; and a timing error detector in communication with the equalizer, wherein the timing error detector is for generating a timing error signal based on the equalized samples of the continuous signal, wherein the timing error signal is generated according to a linear model, wherein the linear model is expressed as:

$$y_k = [KPD\ 0]\theta_k + v_k = H\theta_k + v_k = KPD \times \tau_k + v_k$$

wherein $y_k$ is an observed noisy timing offset which is the output of the timing error detector, $H=[KPD\ 0]$, KPD is a gain of the timing error detector, $v_k$ represents output jitter of the timing error detector, and $\tau_k$ is the timing offset.

* * * * *